United States Patent [19]

Morrissey

[11] 3,720,808
[45] March 13, 1973

[54] CERAMIC CORE LAMINATING ROLL
[75] Inventor: Neal J. Morrissey, Chicago, Ill.
[73] Assignee: General Binding Corporation, Northbrook, Ill.
[22] Filed: Nov. 8, 1971
[21] Appl. No.: 196,384

[52] U.S. Cl..................................219/469, 219/471
[51] Int. Cl...............................................H05b 1/02
[58] Field of Search..............219/469, 471, 470, 244; 338/252, 270, 285, 302, 303, 311

[56] References Cited

UNITED STATES PATENTS

| 1,070,673 | 8/1913 | Eimer | 338/311 X |
| 3,484,581 | 12/1969 | Bliss | 219/469 |
| 1,388,215 | 8/1921 | Tate | 219/470 |
| 1,255,326 | 2/1918 | Macnicol | 338/252 X |
| 3,376,407 | 4/1968 | Wagner | 219/470 |

Primary Examiner—George Harris
Assistant Examiner—F. E. Bell
Attorney—Carlton Hill et al.

[57] ABSTRACT

This invention provides a laminating roll for laminating thermoplastics and the like. The laminating roll comprises an extruded ceramic or pressed cylindrical core, a series of equally spaced holes extending longitudinally through the core, the holes being positioned near the outer periphery of the ceramic core, a helically wound electrical resistance heating coil extending from one end of the core, the holes being arranged so the heating coil can be inserted in the holes only at their ends, and a highly conductive metal tubing surrounding and contacting the core.

11 Claims, 3 Drawing Figures

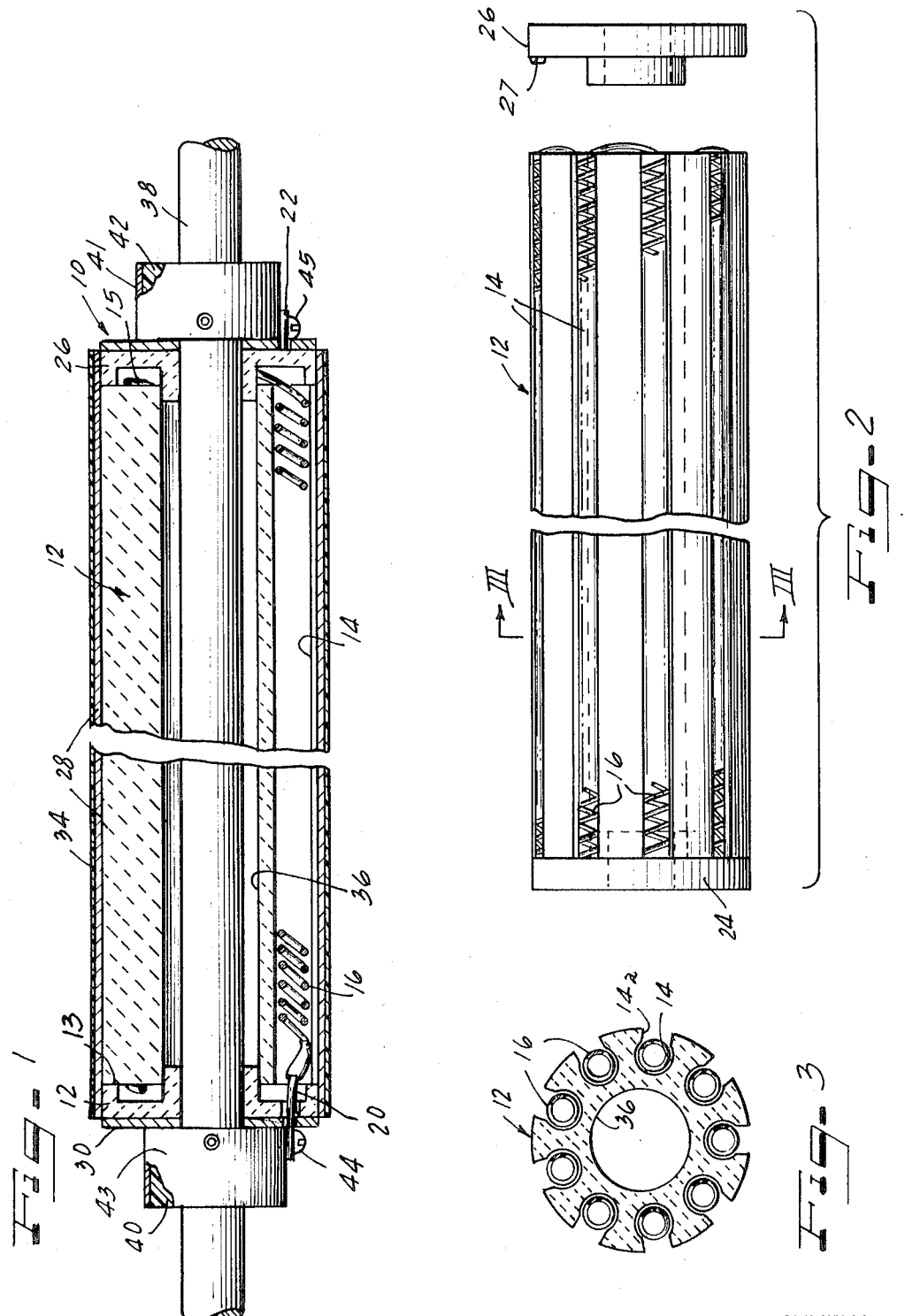

CERAMIC CORE LAMINATING ROLL

BACKGROUND OF THE INVENTION

This invention is related to a ceramic core laminating roll for laminating thermoplastics and the like, applying thermoplastic coatings and drying various materials by contact.

There has been much development work in the field of laminating thermoplastics to each other and thermoplastic sheets to documents where the thermoplastic is a thin, transparent, protective film capable of adhering to the documents upon the application of heat and pressure. One area of important development in this field has been the utilization of the pressure rolls employed in such laminating apparatuses as both the pressure and heating elements for laminating the thermoplastic films to paper documents.

For example, in U.S. Pat. No. 3,138,695, dated June 23, 1964, a laminating apparatus is described in which the pressure rollers of the laminating apparatus are made of an electrically conductive rubber having a sufficiently high resistance to provide a surface heated resilient roll. Devices of the type illustrated in that prior patent have proven satisfactory in many utilizations but have proved to be extremely difficult to manufacture in large quantities with consistently uniform electrical and heating characteristic coupled with long life. Moreover, it has been found upon analysis of such machines and operations over periods of time that thermostatic controls employed in the system could not render sufficient control to prevent relatively wide variation in the temperature over the length of the individual roll or rolls. Accordingly, it has been found difficult with such prior devices to provide extremely fast laminating speeds with a uniformly high quality of output.

In further developments of such laminating apparatuses, there has been provided an apparatus where the pressure and heating roll is a wire wound resilient hot roll in which the rolls are heated at the surfaces thereof for hot pressurized contact with a laminating film positioned over a document to be laminated. In this type of laminating, a heat-conductive resilient roller utilizing a wire wound spiral electrical resistance element is provided with a relatively thin cover of silicone rubber having heat-conductive copper or similar metal impregnated therein, molded upon the outer surface of the roll covering the wire. Accordingly, as in other heating rolls, the copper impregnated silicone rubber coating transmits the heat from the highly heat-conductive core and helically wound resistance wire to the nip between the pressure rollers for transfer to the laminating film. Although such laminating rolls have proven to be highly satisfactory and useful in the lamination of most films, they do present a serious problem in the lamination of heavy gauge films on hot rolls because of the "squeeze-out" of molten polyethylene at film edges which adheres to the hot rolls and eventually creates a variety of problems. The accumulation of the polyethylene is difficult to remove from the hot resilient rolls without cutting or damaging the roll, thus impairing its effectiveness and requiring its replacement.

In order to overcome this problem of removing polyethylene from soft resilient rolls, laminating rolls were provided where a metal sheathed and insulated heating wire or coil was welded into the surface of the laminating roll. This particular laminating roll is effective and has a hard surface which is not easily damaged. However, the cost of such roll is excessive and prohibitive to the great majority of purchasers of laminating rolls. Other rolls have been developed to overcome the problem of the soft resilient roll, such as a roll having a TEFLON (a polytetrafluorethylene manufactured by E.I. duPont deNemours & Co., Inc.) coating. This Teflon coated tubing was placed over the helically wound coil on the core of the roller. Although this particular roll has a hard surface and the polyethylene can easily be removed therefrom, the roll has disadvantages and drawbacks. The roll has a problem of primary overshoot of temperature, that is, the temperature becomes excessively hot upon becoming initially energized and an excessive overshoot, such as over 15° F causes the film to burn through and foul the hot rolls. Also, with such rolls, these excursions of temperature result in a loss of any temperature control.

There is, accordingly, a need for a laminating roll which will eliminate many of the difficulties encountered in the prior laminating roll configurations. Such a laminating roll should be constructed to have temperature control so the roll will have a uniformly heated surface for hot pressurized contact for laminating films positioned in close proximity to another plastic film, or a paper document. Such a roll has uses in other fields such as applying adhesives, inks and coatings whose characteristics are altered by heat. It is also useful for drying sheets or webs where one side can be contacted by the roll surface.

SUMMARY OF THE INVENTION

I have, accordingly, developed a new and improved laminating roll which eliminates many of the difficulties encountered in prior laminating rolls. The laminating roll according to the present invention comprises an extruded cylindrical ceramic core, a series of equally spaced holes extending longitudinally through the core, the holes being positioned near the outer periphery of the core, a helically wound electrical resistance heating coil extending from one end of the core successively through each of the holes to the other end of the core, the holes being arranged so the coil can be inserted in the holes only at their ends, and a highly conductive metal tubing surrounding and contacting the core.

It is, accordingly, an object of the present invention to provide an inexpensive, effective laminating roll which overcomes the disadvantages of prior laminating rolls.

Another object of the present invention is to provide an improved laminating roll employing a highly heat-conductive extruded or pressed ceramic core.

Still a further object of the present invention is to provide a pressure laminating roll having a highly heat-conductive core extending throughout the length thereof intimately coupled with an electrical resistance heating element.

These and other objects, features and advantages of the present invention will be readily apparent from the following description of a certain preferred embodiment thereof, taken in conjunction with the accompanying drawings, although variations and modifications may be effected without departing from the spirit

BRIEF DESCRIPTION OF THE DRAWINGS

FIG. 1 is a side-elevational view, in section, of a laminating roll embodying the present invention;

FIG. 2 is a side-elevational view of the ceramic core of the laminating roll illustrated in FIG. 1; and FIG. 3 is a cross-sectional view of the ceramic core taken on line III—III in FIG. 2.

DESCRIPTION OF THE PREFERRED EMBODIMENT

Referring, initially, to FIG. 1, there is shown a laminating roll 10 embodying the present invention. The laminating roll 10 comprises an extruded or pressed cylindrical ceramic core 12 which has extending longitudinally therethrough a series of equally spaced holes 14 positioned near the outer periphery of the core 12. A helically wound heating coil 16 is provided which extends from one end 13 of the ceramic core 12 successively through each of the longitudinal holes 14 to the other end 15 of the core. Attached to the respective ends of the heating coil 16 are wires 20 and 22 which extend through the end caps 24 and 26 of the ceramic core 12. The core 12 with the heating coil 16 extended through each of the longitudinal grooves 14 is enclosed in a highly conductive metal tubing 28.

The metal tubing 28 can be any highly conductive material such as aluminum or copper. The metal tubing 28 has a coating 34 of a heat-conductive material. The coating may be a molded resilient material such as silicone rubber or a hard material such as Teflon. The type of coating applied to the roll depends upon the weight of the film to be laminated, i.e., a light or heavy gauge film. Generally, the roll is coated with a molded resilient material for laminating a light gauge film, and with Teflon for laminating a heavy gauge film.

As illustrated more specifically in FIGS. 2 and 3, the ceramic core 12 has equally spaced longitudinal holes 14 which extend through the full length of the core. The helically wound heating coil 16 is stretched from one end 13 of the core successively through each of the grooves 14 to the opposite site end 15 of the core. The heating coil 16 is stretched from about 1.5 to about 4.0 times its normal closed length. The heating coil 16 may consist of any suitable wire such as a conventional nickel-chrome-iron wire.

As shown in FIG. 3, the equally spaced holes 14 are spaced at about 40° in a circular manner near the outer periphery of the core 12. The holes 14 are preferably partially open along their sides to the outer periphery of the core 12 as at 14a and are accessible at both their ends. The openings extruding or pressed along the sides of the holes 14 exposed to the outer periphery of the core are not sufficient to have the heating coil 16 inserted therethrough into the holes. The holes 14 are arranged, and are of a size that the heating coil 16 can only be inserted in the holes at their ends.

As shown in FIG. 1, wire ends 20 and 22 are extended from respective ends of the heating coil 16 and are arranged to be connected to electrical terminals described below to provide an electrical input into one end of the roll through end 20 and an electrical output at the other end of the roll at 22. The laminating roll is mounted on a shaft which runs through a bore 36 of the core 12 and through the caps 24 and 26, respectively against the ends 13 and 15 of the core. The shaft is secured in position in the roll by dielectric bearing blocks 40 and 42 respectively carrying metal commutating sleeves 41, 43 and positioned on the shaft 38 against end plates 30 and 32 which are placed on the shaft 38 against the outside of the respective end plates 24 and 26 of the core. The ends 20 and 22 are connected to respective commutator sleeves 41, 43 by any suitable means, such as screws 44, 45, shown, soldering, or brazing. End caps 24 and 26 are prevented from rotation relative to the core by one or more abutments 27 engaging the core slots 14a.

The present laminating roll can be used in any suitable laminating apparatus such as those described in U.S. Pat. No. 3,138,695, dated June 23, 1964; or U.S. Pat. No. 3,401,439, dated Sept. 17, 1968.

In constructing the laminating roll 10, as described herein, there is extruded or pressed a cylindrical core of unfired ceramic such as steatite. The extruded material is cut to an appropriate length and fired. The length of the core is determined by the desired length of the resultant laminating roll. Multiples of short pieces, however, can be employed to make up the desired length of the core. The outer diameter of the ceramic core is determined by the required inner diameter of the metal tubing into which the core is to be inserted.

The core contains nine equally spaced holes 14 extending longitudinally therethrough and positioned near the outer periphery of the core. Of course, an even number of holes may be used in rolls where both ends of the heater wire are desired to exit at the same end of the roll.

The heating element or wire 16 is helically wound such as on a mandrel into a closed coil. The diameter and length of the coil are determined by the wattage required to heat the roll. The coil is inserted in the end of one of the holes 14. It cannot be inserted in the partial opening 14a along the side of the hole. Then, the coil is drawn through the hole to the other end at which point it is crossed over to the next hole and the process is repeated through each hole. At the respective ends of the core, the end caps 24 and 26 are placed with wire ends 20 and 22 extending from the ends of the coil 16 through the respective caps.

After the wires are secured through the end caps, the core and heating coil are inserted snugly into the metal tubing 28 which has an outer heat-conductive inert coating 34, such as TEFLON, a polytetrafluoroethylene manufactured by E.I. duPont deNemours & Co., Inc. When a resilient hot roll is desired, a relatively thicker covering of silicone rubber bonded to the metal tubing 28 may be employed. With the metal tubing surrounding the core and in contact with the outer surface of the core, the shaft is inserted through the core and end caps. The shaft 38 is secured in position in the roll by the bearing blocks 40, 42 placed at each end on the shaft against the respective end plates 30, 32.

The roll constructed in accordance with the present invention has achieved a number of extremely important advantages over prior roll systems. Electrical safety of heating rolls has always been a concern in the industry and the roll of the present invention provides a safety factor substantially greater than that provided in prior systems. As will be noted, in the roll of the present invention, the electrically conducting wires are mounted in a ceramic core constructed such that the wires cannot move outwardly against the cover of the roll. At the same time, the roll cover is metal which is substantially impervious to mutilation by knives or similar tools sometimes improperly employed for cleaning the roll surface. The roll of the present invention is extremely inexpensive. It is manufactured from ceramic extrusions or pressings and conventional tubing requiring substantially no specially trained, skilled, labor in construction or assembly. The roll is easy to clean and in the event that the metal cover is in any way mutilated, the entire sleeve, with its coating of rubber or plastic may be removed and replaced at little expense. The axial underlayment of hot wires provides a maximum heating capability which has been found to be substantially uniform throughout the axial length of the roll and, through the use of the metal sleeve 28, the heat is uniformly transferred throughout the surface of the roll in an extremely rapid fashion. As a result of the arrangement of the present roll, heat transfer to the roll surface is extremely prompt, thereby minimizing warmup time and substantially reducing thermostatic temperature overshoots. Temperature uniformity is, accordingly, substantially improved and the quality of the laminates produced by this roll apparatus is rendered substantially more uniform.

Still a further advantage of the structure of the present invention is that the amount of wattage available in the roll is readily modified in any roll desired by increasing the length of the wire used in the roll. Since the wire is wound in a coil, and that initial winding is done on a mandrel providing that the runs of the wire are adjacent each other, the final length of the wire may be modified by stretching the coils apart. In typical installations, this stretching approximates 1.5 to 4 times the closed length of the wound coil and this arrangement gives, of course, a range of wattaches of approximately 300 percent variation. If desirable, to compensate for a drop-off in temperature at ends of the rolls, the helical heating wire may be taper wound to provide more closely spaced turns near the ends than at the center of the roll surface.

It will be apparent from the above description of this embodiment of the present invention that an improved laminating roll is provided having the desired features for efficient, inexpensive lamination of thermoplastic films and the like.

I claim as my invention:

1. A heating roll for laminating or the like, said roll comprising: an extruded fired ceramic cylindrical core having a plurality of equally spaced holes extending longitudinally through said core, adjacent the outer periphery of said core; a helically wound electrical resistance heating coil stretched from one end of said core successively back and forth through the successive holes to the other end of said core, said heating coil being stretched from about 1.5 to about 4.0 times its closed length; and a highly heat-conductive metal tubing surrounding and contacting said core.

2. A roll according to claim 1, wherein said holes are partially open along their sides to the outer periphery of said core and wherein the electrical resistance element is larger than the said partial opening whereby it is positively retained in the holes.

3. A roll according to claim 2, wherein said heating coil comprises a helical coil of uninsulated resistance wire.

4. A roll according to claim 1, wherein said ceramic core is extruded or pressed fired steatite.

5. A roll according to claim 1, wherein external surfaces of the tubing is coated with a molded resilient material.

6. A roll according to claim 1, wherein said tubing is coated with a thin inert layer of plastic.

7. A roll according to claim 3 wherein the helical wire is wound with adjacent turns more closely spaced at the ends of the roll than at the center thereof.

8. A heating roll for laminating and the like, said roll comprising: an extruded or pressed fired ceramic cylindrical core; a series of holes extending longitudinally through said core and equally spaced near the outer periphery of said core, said holes being partially open along their sides to the outer periphery of said core and being accessible at their ends; a helically wound electrical resistance heating coil stretched from one end of said core successively through each of said holes to the other end of said core, said heating coil being stretched from about 1.5 to about 4.0 times its closed length, said holes being arranged so that said heating coil can be inserted in said holes only at their ends; dielectric end caps closing said holes and covering said heating coil at the ends of the core, separate commutator means connected to each end of said coil for energizing said coil; and a highly heat-conductive metal tubing surrounding and contacting said core and end caps and providing an exterior roll surface.

9. A roll according to claim 8, wherein said ceramic core and end caps are fired steatite, and the tubing is a metal selected from the group consisting of aluminum and copper.

10. A roll according to claim 9, wherein the metal tubing is coated with TEFLON.

11. A roll according to claim 7 wherein the helical wire is wound more densely at ends of the roll than at the center thereof.

* * * * *